United States Patent
Kwon (10) Patent No.: US 10,870,405 B2
(45) Date of Patent: Dec. 22, 2020

(54) AIRBAG FOR VEHICLE

(71) Applicants: Hyundai Motor Company, Seoul (KR); Kia Motors Corporation, Seoul (KR)

(72) Inventor: Hyock In Kwon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 94 days.

(21) Appl. No.: 16/058,350

(22) Filed: Aug. 8, 2018

(65) Prior Publication Data

US 2019/0283700 A1    Sep. 19, 2019

(30) Foreign Application Priority Data

Mar. 19, 2018    (KR) .................. 10-2018-0031328

(51) Int. Cl.
*B60R 21/207*    (2006.01)
*B60R 21/231*    (2011.01)
(Continued)

(52) U.S. Cl.
CPC .......... *B60R 21/207* (2013.01); *B60R 21/233* (2013.01); *B60R 21/2338* (2013.01); *B60R 21/23138* (2013.01); *B60R 2021/0006* (2013.01); *B60R 2021/0044* (2013.01); *B60R 2021/0048* (2013.01); *B60R 2021/0058* (2013.01); *B60R 2021/0273* (2013.01); *B60R 2021/161* (2013.01); *B60R 2021/23107* (2013.01); *B60R 2021/23146* (2013.01); *B60R 2021/23308* (2013.01); *B60R 2021/23388* (2013.01)

(58) Field of Classification Search
CPC . B60R 21/207; B60R 21/2338; B60R 21/233; B60R 21/23138; B60R 2021/0044; B60R 2021/23308; B60R 2021/23146; B60R 2021/23107; B60R 2021/161; B60R 2021/0273; B60R 2021/0048; B60R 2021/23388; B60R 2021/0058; B60R 2021/0006; B60R 2021/23161; B60R 2021/23386
See application file for complete search history.

(56) References Cited

U.S. PATENT DOCUMENTS

| | | | |
|---|---|---|---|
| 5,636,862 A | 6/1997 | Cheung et al. | |
| 5,730,464 A | 3/1998 | Hill | |

(Continued)

FOREIGN PATENT DOCUMENTS

| | | |
|---|---|---|
| DE | 9405143 U1 | 5/1994 |
| JP | 2006-008105 A | 1/2006 |

(Continued)

*Primary Examiner* — Darlene P Condra
(74) *Attorney, Agent, or Firm* — Mintz Levin Cohn Ferris Glovsky and Popeo, P.C.; Peter F. Corless (57) ABSTRACT

An airbag for a vehicle is provided. The airbag includes an airbag cushion that has a plurality of chambers and the plurality of chambers are connected to be interlocked with each other by an operation tether. Accordingly, when an occupant presses against a specific chamber due to a vehicle collision, the other chamber is deformed to wrap the occupant, thereby restraining the occupant in a seat and minimizing the occurrence of injury.

15 Claims, 10 Drawing Sheets

(51) Int. Cl.
  *B60R 21/233* (2006.01)
  *B60R 21/2338* (2011.01)
  *B60R 21/00* (2006.01)
  *B60R 21/02* (2006.01)
  *B60R 21/16* (2006.01)

(56) References Cited

U.S. PATENT DOCUMENTS

| | | |
|---|---|---|
| 6,959,945 B2 | 11/2005 | Fischer et al. |
| 8,480,125 B1 | 7/2013 | Belwafa et al. |
| 8,480,128 B2 | 7/2013 | Fukawatase et al. |
| 8,632,094 B2 | 1/2014 | Schmidt et al. |
| 8,684,408 B2 | 4/2014 | Thomas et al. |
| 9,266,494 B2 | 2/2016 | Wang |
| 9,592,788 B2 | 3/2017 | Wiik et al. |
| 9,598,044 B2 | 3/2017 | Fujiwara |
| 9,771,046 B2 | 9/2017 | Lee |
| 9,809,189 B2 | 11/2017 | Grell et al. |
| 9,994,181 B1 * | 6/2018 | Dubaisi ............... B60R 21/207 |
| 10,023,147 B2 | 7/2018 | Kwon |
| 10,189,432 B2 | 1/2019 | Matsushita et al. |
| 10,259,420 B2 | 4/2019 | Thomas |
| 10,336,283 B2 | 7/2019 | Rickenbach et al. |
| 2003/0006596 A1 * | 1/2003 | Schneider ........... B60R 21/233 280/743.1 |
| 2004/0051285 A1 | 3/2004 | Fischer |
| 2006/0131847 A1 | 6/2006 | Sato et al. |
| 2007/0108753 A1 | 5/2007 | Pang et al. |
| 2007/0152430 A1 * | 7/2007 | Wollin ............... B60R 21/233 280/729 |
| 2012/0025499 A1 | 2/2012 | Shibayama et al. |
| 2012/0049498 A1 * | 3/2012 | Wiik ............... B60R 21/23138 280/743.2 |
| 2012/0091697 A1 | 4/2012 | Wiik et al. |
| 2013/0076014 A1 | 3/2013 | Thomas et al. |
| 2014/0035264 A1 | 2/2014 | Fukushima et al. |
| 2014/0097601 A1 | 4/2014 | Fukawatase et al. |
| 2014/0284906 A1 | 9/2014 | Akiyama |
| 2015/0076803 A1 | 3/2015 | Fujiwara |
| 2015/0274111 A1 | 10/2015 | Ishida et al. |
| 2015/0314748 A1 * | 11/2015 | Mihm ............... B60R 21/23138 280/730.2 |
| 2016/0107602 A1 | 4/2016 | Nakashima |
| 2016/0114757 A1 | 4/2016 | Fujiwara |
| 2016/0167616 A1 | 6/2016 | Wiik |
| 2016/0200278 A1 | 7/2016 | Wiik et al. |
| 2016/0229369 A1 | 8/2016 | Thomas et al. |
| 2017/0129444 A1 | 5/2017 | Fukawatase et al. |
| 2017/0174174 A1 | 6/2017 | Ohno et al. |
| 2017/0182963 A1 | 6/2017 | Hiraiwa et al. |
| 2017/0182969 A1 | 6/2017 | Fujiwara |
| 2017/0334386 A1 | 11/2017 | Park et al. |
| 2018/0118150 A1 | 5/2018 | Kwon |
| 2018/0126944 A1 | 5/2018 | Choi |
| 2018/0290619 A1 | 10/2018 | Kitagawa |
| 2018/0326938 A1 | 11/2018 | Rickenbach et al. |
| 2019/0016293 A1 | 1/2019 | Saso |
| 2019/0047504 A1 | 2/2019 | Sugishima et al. |
| 2019/0054890 A1 | 2/2019 | Kwon |
| 2019/0061671 A1 * | 2/2019 | Jang ............... B60R 21/261 |
| 2019/0061675 A1 | 2/2019 | Kwon |
| 2019/0061676 A1 | 2/2019 | Kwon |
| 2019/0092271 A1 | 3/2019 | Park et al. |
| 2019/0152421 A1 | 5/2019 | Byun et al. |
| 2019/0161053 A1 | 5/2019 | Gwon et al. |

FOREIGN PATENT DOCUMENTS

| | | |
|---|---|---|
| JP | 4165239 B2 | 10/2008 |
| JP | 2009-137441 A | 6/2009 |
| JP | 2009-234562 A | 10/2009 |
| JP | 2010-083414 A | 4/2010 |
| JP | 2011-240807 A | 12/2011 |
| JP | 2012-051557 A | 3/2012 |
| JP | 2014-051138 A | 3/2014 |
| JP | 5594340 B2 | 9/2014 |
| JP | 5754436 B2 | 7/2015 |
| JP | 2016-083955 A | 5/2016 |
| JP | 2016-107721 A | 6/2016 |
| JP | 2016-203945 A | 12/2016 |
| KR | 10-2008-0101478 A | 11/2008 |
| KR | 10-2012-0051279 A | 5/2012 |
| KR | 10-1292323 B1 | 7/2013 |
| KR | 10-2014-0132188 A | 11/2014 |
| KR | 10-2015-0001100 A | 1/2015 |
| KR | 10-2017-0067962 A | 6/2017 |
| WO | 2014-033820 A1 | 3/2014 |
| WO | 2017-014421 A1 | 1/2017 |

* cited by examiner

AIRBAG FOR VEHICLE

CROSS REFERENCE TO RELATED APPLICATION

The present application claims priority of Korean Patent Application No. 10-2018-0031328 filed on Mar. 19, 2018, the entire contents of which is incorporated herein for all purposes by this reference.

BACKGROUND

Field of the Disclosure

The present disclosure relates to an airbag for a vehicle, which protects an occupant from impact and restrains a movement of the occupant when a vehicle collision occurs, thereby minimizing injury of the occupant.

Description of the Related Art

In the field of vehicles, technologies for securing the safety of occupants in addition to driving performance, convenience, and functionality have been developed. Among various safety devices which have been applied to vehicles, an airbag has been applied as an effective device for protecting the occupant from impact.

The airbag protects a driver and passengers during a vehicle collision. In particular, the airbag typically includes a collision sensor configured to sense a vehicle collision, a controller configured to actuate the airbag based on sensing result of the collision sensor, and an airbag module configured to actuate the airbag based on a signal from the controller. Typically, airbags are classified into and applied as a driver's airbag, a passenger seat airbag, a side airbag, a roof airbag, and the like, depending on an installation position thereof within the vehicle and a target to be protected.

In particular, during a lateral collision, since an upper body of the occupants moves, a collision between occupants sitting on the driver's seat and the passenger seat occurs or the occupants bump against an arm rest, a seat or the like, thus causing occupant injury. In addition, when the occupant does not wear a seat belt, the occupant's body is thrust forward, and thus, even when the front airbag is deployed, a substantial impact is applied to the occupant Additionally, even when the occupant wears the seat belt, since the occupant's body rotates due to the inertia, a secondary injury may occur.

The foregoing is intended merely to aid in the understanding of the background of the present disclosure, and is not intended to mean that the present disclosure falls within the purview of the related art that is already known to those skilled in the art.

SUMMARY

The present disclosure provides an airbag for a vehicle which, when a vehicle collision occurs, protects an occupant from lateral impact and simultaneously restrains the occupant within a seat to safely protect the occupant.

In order to achieve the above object, an airbag for a vehicle according to the present disclosure may include an airbag cushion positioned proximate to a seatback, having a plurality of chambers to be deployed in front of the seatback, and having an aperture formed at a rear portion thereof; and an operation tether provided to pass through the aperture, and is connected at both end portions thereof to the plurality of chambers. When an occupant pushes a specific chamber due to a vehicle collision, the operation tether provides a pulling force to the other chamber to cause the other chamber to be bent towards an occupant side.

The airbag cushion may include an upper chamber to be disposed proximate to the occupant's head and a lower chamber to be disposed proximate to the occupant's body during deployment, and the operation tether may be provided to pass through the aperture, a first end portion of the operation tether may be connected to the upper chamber, and a second end portion may be connected to the lower chamber. When the operation tether is provided to pass through the aperture, the first end portion may be connected to a front portion of the upper chamber and the second end portion may be connected to a front portion of the lower chamber.

The airbag according to the present disclosure may further include a restraint tether secured at both ends thereof to the seatback and extending from the occupant side in a direction opposite to the occupant to wrap around the upper chamber. The first end portion of the operation tether may be connected to the front portion of the upper chamber and the second end portion may be connected to the restraint tether. In particular, the second end portion may be connected to an end portion of the restraint tether located at the occupant side.

The airbag cushion may include an upper chamber to be disposed proximate to the occupant's shoulder or the occupant's head during deployment; a lower chamber to be disposed proximate to the occupant's body during deployment; and a central chamber positioned between the upper chamber and the lower chamber, and disposed in front of the occupant's body during deployment, and the operation tether may be provided to pass through the aperture, the first end portion of the operation tether may be connected to the upper chamber, and the second end portion may be connected to the central chamber.

The aperture may be formed in a rear portion of the upper chamber. The first end portion of the operation tether may be connected to a front portion of the upper chamber and the second end portion may be connected to a front portion of the central chamber. The airbag according to the present disclosure may further include a guide part through which the operation tether passes, the guide part may be installed on the seatback and positioned to be spaced apart from the aperture of the airbag cushion to the occupant side. The guide part may be secured to the seatback and may have a guide aperture formed therein to allow the operation tether to pass therethrough.

The upper chamber may be configured to be divided into a plurality of upper chambers to wrap around the occupant's head at a lateral side or in front of the occupant during deployment, and the operation tether may be formed such that the first end portion may be divided into a plurality of segments to be connected to the plurality of upper chambers, respectively, and the second end portion may be connected to the central chamber.

The upper chamber may include a first chamber formed to support the occupant's shoulder during deployment and a second chamber that extends upward from the first chamber and formed to wrap around a lateral side and the front of the occupant's head. When the operation tether is provided to pass through the aperture, the first end portion may be divided into the segments to be connected to the first chamber and the second chamber, respectively and the second end portion may be connected to the central chamber.

The airbag cushions may be deployed at both lateral sides of the seatback, and the second chambers of the both airbag cushions may be formed in a hook shape to be engaged with each other, and thus, both second chambers may be engaged with each other when the airbag cushions are deployed. The upper chamber may include a third chamber formed to support the occupant's shoulder during deployment and a fourth chamber formed to be bent at and extend from the third chamber towards the occupant side to be disposed in front of the occupant's body. The operation tether may be provided to pass through the aperture, with a first end portion connected to a front portion of the third chamber and a front portion of the fourth chamber, and the second end portion connected to the central chamber. The airbag cushions may be deployed at both lateral sides of the seatback, and the fourth chambers of the both airbag cushions may be formed in a hook shape to be engaged with each other, and thus, the both fourth chambers may be engaged with each other when the airbag cushions are deployed.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinafter, an airbag for a vehicle according to exemplary embodiments of the present disclosure will be described with reference to the accompanying drawings.

Figure 1:
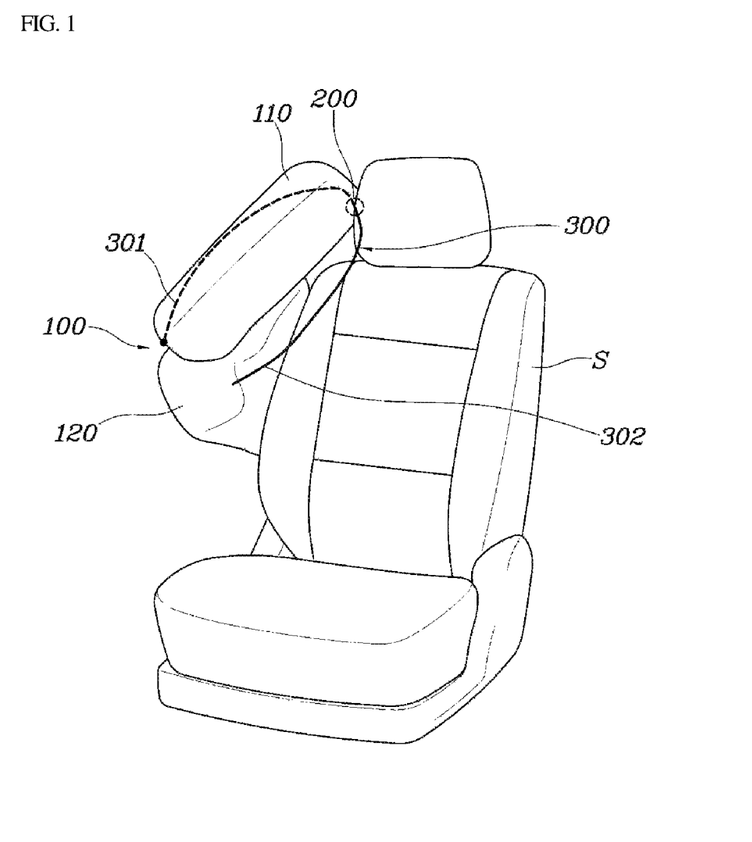
FIGS. 1 and 2 are views showing an airbag for a vehicle according to a first exemplary embodiment of the present disclosure.
Figure 2:
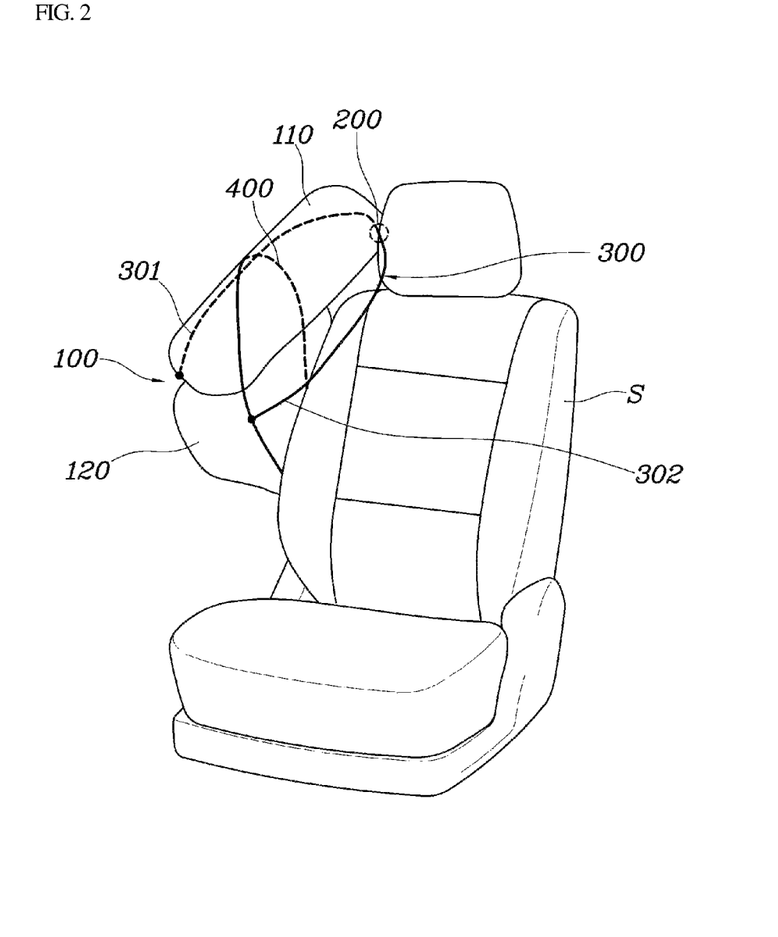
Figure 3:
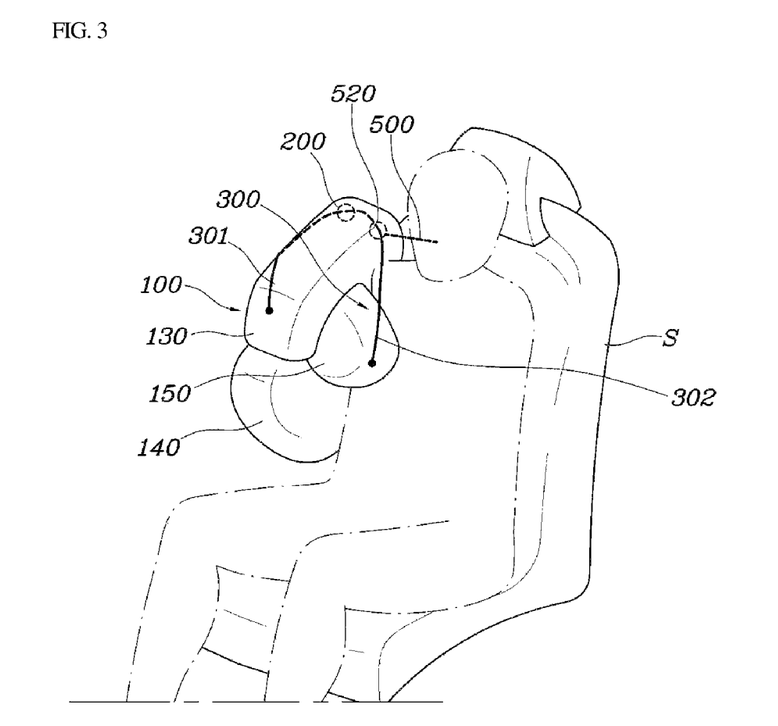
FIGS. 3 and 4 are views showing an airbag for a vehicle according to a second exemplary embodiment of the present disclosure.
Figure 4:
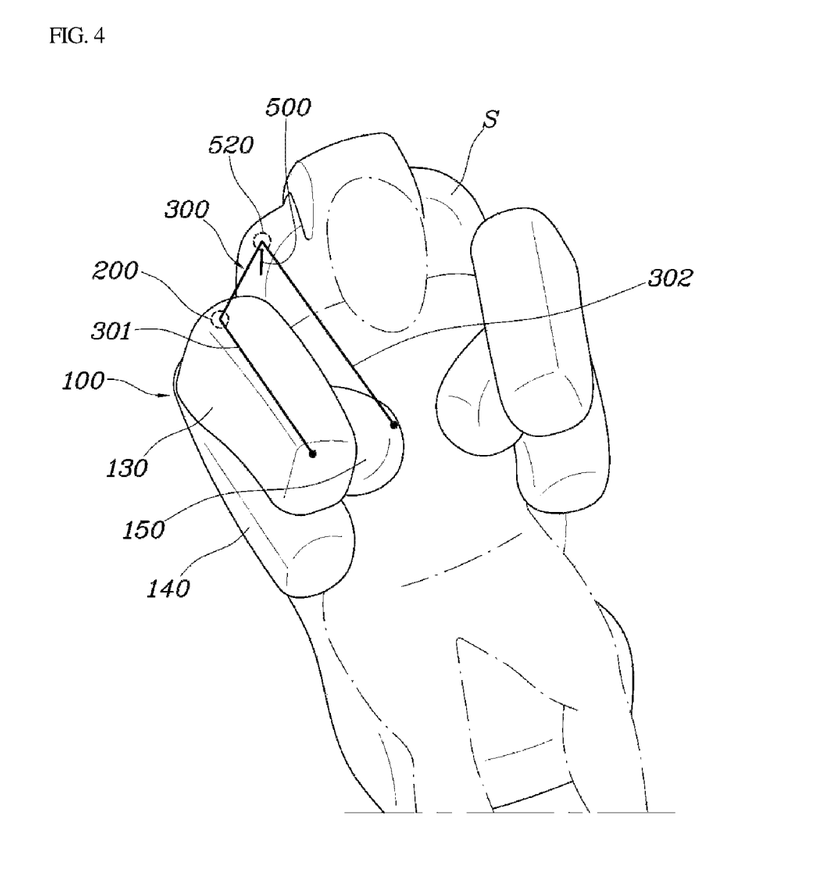
Figure 5:
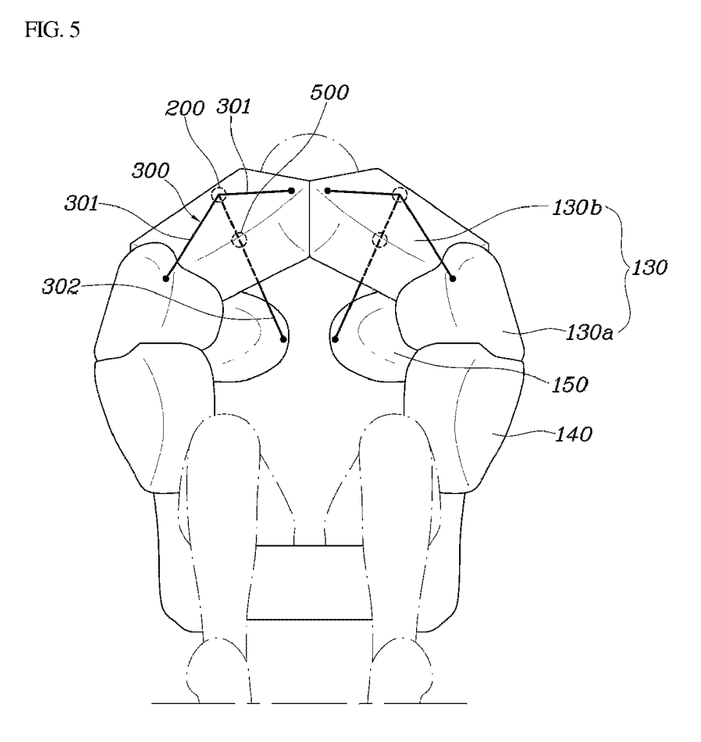
FIGS. 5 to 7 are views showing an airbag for a vehicle according to a third exemplary embodiment of the present disclosure.
Figure 6:
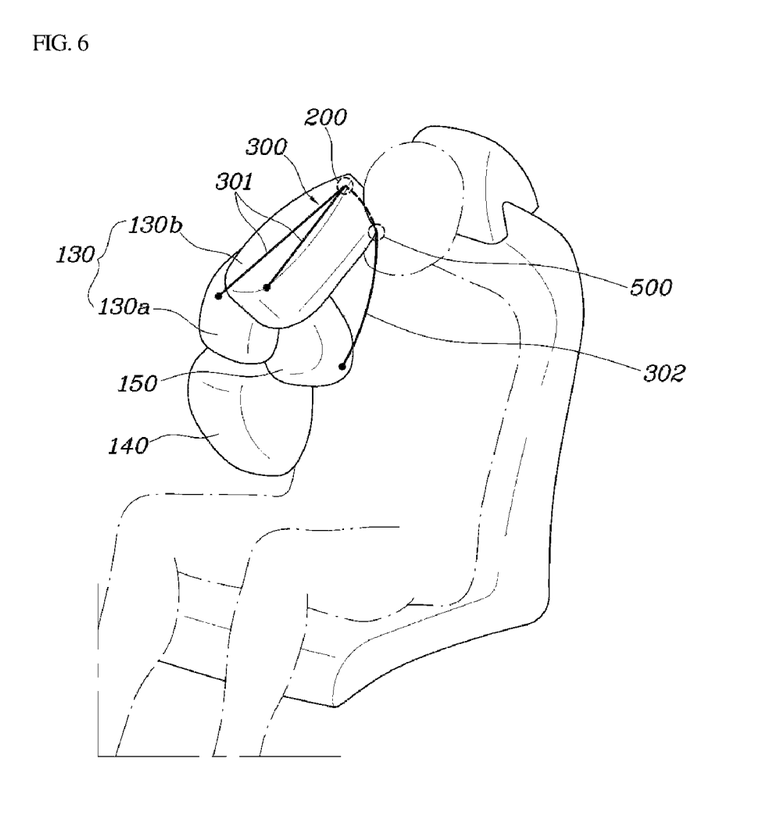
Figure 7:
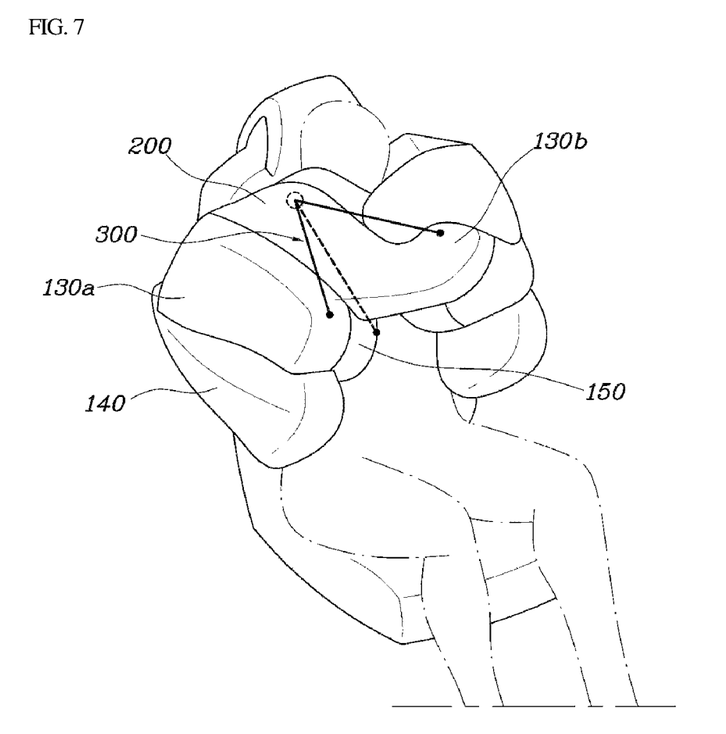
Figure 8:
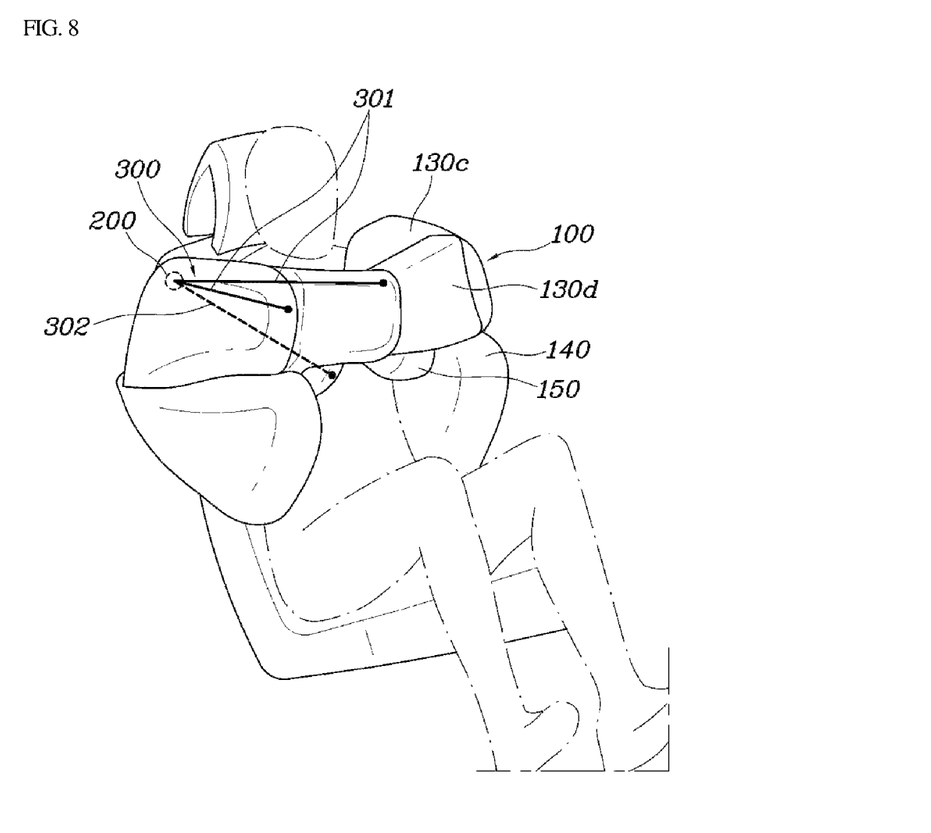
FIGS. 8 to 10 are views showing an airbag for a vehicle according to a fourth exemplary embodiment of the present disclosure.
Figure 9:
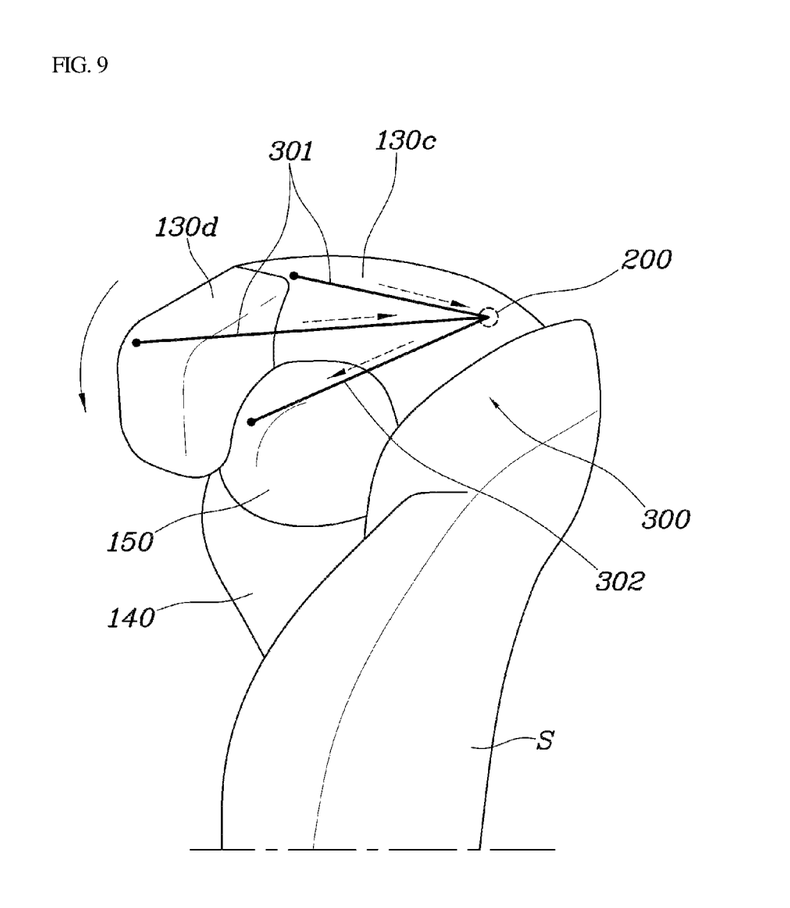
Figure 10:
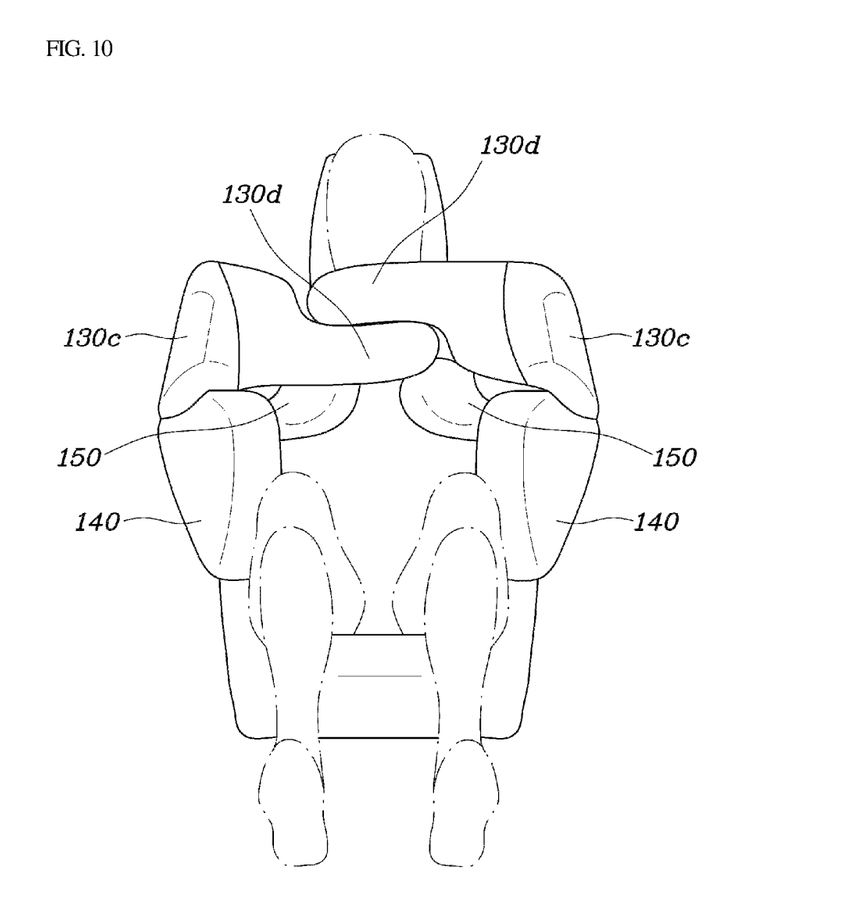

FIGS. 1 and 2 are views showing an airbag for a vehicle according to a first exemplary embodiment of the present disclosure, FIGS. 3 and 4 are views showing an airbag for a vehicle according to a second exemplary embodiment of the present disclosure, FIGS. 5 to 7 are views showing an airbag for a vehicle according to a third exemplary embodiment of the present disclosure, and FIGS. 8 to 10 are views showing an airbag for a vehicle according to a fourth exemplary embodiment of the present disclosure.

An airbag for a vehicle according to the present disclosure may include an airbag cushion 100 positioned proximate to a seatback S, having a plurality of chambers to be deployed in front of the seatback S and having an aperture 200 formed at a rear portion thereof; and an operation tether 300 provided to pass through the aperture 200, and connected at both end portions thereof to the plurality of chambers, respectively. In particular, when an occupant pushes a specific chamber (e.g., a first chamber) due to a vehicle collision, the operation tether 300 provides a pulling force to the other chamber (e.g., a second chamber) to cause the other chamber to be bent towards an occupant side.

As described above, the present disclosure provides the airbag cushion 100 having a plurality of chambers and an operation tether 300 connected to the airbag cushion 100. The aperture 200 may be formed in the rear portion of the airbag cushion 100 and the both end portions of the operation tether 300 may be connected to the plurality of chambers, respectively, and thus, when the specific chamber is deformed, the other chamber may be interlocked with the specific chamber by the operation tether 300 and then may be deformed.

In other words, when a vehicle collision occurs, the occupant is pressed against the chamber of the airbag cushion 100, and the operation tether 300 connected to the specific chamber which is being pressed and pushed pulls the other chamber, and thus, the specific chamber and the other chamber may be deformed together. Accordingly, the operation tether 300 may be provided to pass through the aperture 200 formed in the airbag cushion 100, and thus, advancing directions of a first end portion and a second end portion are opposite to each other. In other words, by forming the aperture 200 in the rear portion of the airbag cushion 100 and providing the plurality of chambers in front of the airbag cushion 100, since the first end portion 301 and the second end portion 302 of the operation tether 300 extend towards in front of the airbag cushion 100 when the operation tether 300 is caught in the aperture 200, both end portions may be moved in opposite directions with respect the aperture 200.

Accordingly, when the operation tether 300 is extended by pushing the first end portion connected to the specific chamber (e.g., a first chamber), a pulling force is generated on the second end portion connected to the other chamber (e.g., a second chamber), and thus, the other chamber may be deformed in response to a movement of the specific chamber. In the event of a vehicle collision, when the occupant presses against the first chamber, the second chamber is interlocked with the first chamber by the operation tether 300 and is then deformed, and thus, the airbag cushion 100 may protect the occupant while wrapping around and restraining the occupant.

The present disclosure described above will be described below according to various exemplary embodiments. In particular, FIG. 1 illustrates a first exemplary embodiment in which the airbag cushion 100 may include an upper chamber 110 to be disposed proximate to the occupant's head (e.g., an upper region of a seat) and a lower chamber 120 to be disposed proximate to the occupant's body (e.g. a lower region of a seat) during deployment, and the operation tether 300 may be provided to pass through the aperture 200, a first end portion 301 of the operation tether may be connected to the upper chamber 110, and a second end portion 302 may be connected to the lower chamber 120.

As described above, the airbag cushion 100 may include the upper chamber 110 and the lower chamber 120 to allow both chambers to be mutually bending-deformed, and the upper chamber 110 and the lower chamber 120 may be connected to each other by the operation tether 300 to be interlocked with each other. In particular, the aperture 200 may be formed in a rear portion of the upper chamber 110, and the first end portion 301 may be connected to the upper chamber 110 and the second end portion 302 may be connected to the lower chamber 120 in a state where the operation tether 300 is provided to pass through the aperture 200. As a result, when the occupant presses against the lower chamber 120 due to a lateral collision, as the second end portion 302 of the operation tether 300 is pushed and moved together with the lower chamber 120, a pulling force is applied to the upper chamber 110 to which the first end portion 301 of the operation tether 300 is connected, and thus, the upper chamber 110 may be bending-deformed (e.g., deformed by being bent). Accordingly, when the upper chamber 110 is bending-deformed in response to a deformation of the lower chamber 120, the upper chamber 110 may support the occupant's head to safely protect the occupant from a lateral collision.

In a state where the above-described operation tether 300 is provided to pass through the aperture 200, the first end portion 301 of the operation tether may be connected to a front portion of the upper chamber 110 and the second end portion 302 may be connected to a front portion of the lower chamber 120. As described above, by connecting the first end portion 301 and the second end portion 302 of the operation tether 300 to the front portions of the upper chamber 110 and the lower chamber 120, respectively, when the pulling force is provided through the operation tether 300, a deformation by which the front portion of the upper chamber 110 or the lower chamber 120 is pulled rearward may be performed, thus causing the upper chamber 110 or the lower chamber 120 to be deformed to wrap around the occupant. As a result, the airbag cushion 100 may perform a deformation operation for restraining the occupant while protecting the occupant from an impact.

Furthermore, as illustrated in FIG. 2, the airbag according to the present disclosure may further include a restraint tether 400 secured at both ends thereof to the seatback S and extending from an occupant side in a direction opposite to the occupant (e.g., extending out from the seat away from the occupant) to wrap around the upper chamber 110. As the restraint tether 400 extends to wrap around the upper chamber 110 while secured to the seatback S, it may be possible to restrict a position where the upper chamber 110 is deployed and a deployment shape of the upper chamber when the airbag cushion 100 is inflated. In particular, the seatback S to which the restraint tether 400 is connected may be a seat frame or a seat recliner side.

When the restraint tether 400 is arranged to wrap around the upper chamber 110 as described above, the first end portion 301 of the operation tether 300 may be connected to the front portion of the upper chamber 110, and the second end portion 302 may be connected to the restraint tether 400, wherein the second end portion may be connected to an end portion of the restraint tether disposed at the occupant side. As a result, as the airbag cushion 100 is inflated when a vehicle collision occurs, the lower chamber 120 and the upper chamber 110 may be deployed while a position and shape to which the upper chamber 110 is inflated upward may be limited by the restraint tether 400.

In this state, when the occupant moving by collision inertia presses against the restraint tether 400 together with the lower chamber 120, as the operation tether 300 connected to the restraint tether 400 is moved, a pulling force is applied to the upper chamber 110 connected to the first end portion 301 of the operation tether 300, and thus, the front portion of the upper chamber 110 may be bending-deformed. Accordingly, when the airbag cushion 100 is deployed, a deployment position of the upper chamber 110 may be determined by the restraint tether 400, and the upper chamber may be interlocked with the lower chamber 120 and the restraint tether 400 by the operation tether 300 and be bending-deformed to restrain the occupant.

Furthermore, as a second exemplary embodiment, as illustrated in FIGS. 3 and 4, the airbag cushion 100 may include an upper chamber 130 to be disposed proximate to the occupant's shoulder or the occupant's head during deployment; a lower chamber 140 to be disposed proximate the occupant's body during deployment; and a central chamber 150 positioned between the upper chamber 130 and the lower chamber 140 and disposed in front of the occupant's body during deployment. The upper chamber 130, the lower chamber 140, and the central chamber 150 may be connected to and in communication with each other to be inflated by supplying gas from one inflator, or may be configured to receive gas through a plurality of inflators, respectively. Further, positions of the upper chamber 130, the lower chamber 140, and the central chamber 150 when deployed may be determined based on a shape of each of the chambers, and a separate diaphragm structure and a tether may be connected to the each of the chambers.

The operation tether 300 provided in the above-described airbag cushion 100 is provided to pass through the aperture 200, the first end portion 301 of the operation tether may be connected to the upper chamber 130, and the second end portion 302 may be connected to the central chamber 150, and thus, the upper chamber 130 and the central chamber 150 may be interlocked with each other. Particularly, by forming the aperture 200 in a rear portion of the upper chamber 130, it may be possible to switch a direction in which the pulling force caused by the operation tether 300 is exerted.

In the above-described operation tether 300, the first end portion 301 may be connected to the lower chamber 140 together with the upper chamber 130. However, since the lower chamber 140 may be positioned proximate to the occupant's waist, no additional deformation of the lower chamber is required. In addition, head and body of the occupant may be wrapped and restrained by inducing a deformation of the upper chamber 130, and thus, the first end portion 301 of the operation tether 300 may be connected to the upper chamber 130.

As a result, when the occupant pushes against the central chamber 150 during the collision, as the second end portion 302 of the operation tether 300 is pushed and moved along with the central chamber 150, the pulling force is applied to the upper chamber 130 connected to the first end portion 301 of the operation tether 300, and thus, the upper chamber 130 may be bending-deformed. As described above, when the central chamber 150 is pressed and deformed by the occupant, the upper chamber 130 may be interlocked with the central chamber and then may be bending-deformed, as a result, the upper chamber 130 may support the head and the body of the occupant, and simultaneously wrap around and restrain the occupant. In such an operation of the tether 300, the first end portion 301 may be connected to a front portion of the upper chamber 130 and the second end portion 302 may be connected to a front portion of the central chamber 150.

Accordingly, by connecting the first end portion 301 and the second end portion 302 of the operation tether 300 to the front portions of the upper chamber 130 and the central chamber 150, respectively, the front portion of the upper chamber 130 may be deformed towards the central chamber 150 when the pulling force is generated on the operation tether 300 as the central chamber 150 is pushed by the occupant. The central chamber 150 thus supports the occupant, and at the same time, the upper chamber 130 may be bent towards and wrap around the occupant, and thus, it may be possible to perform more stable restraint on the occupant.

Meanwhile, as illustrated in FIGS. 3 and 4, the airbag according to the present disclosure may further include a guide part 500 installed on the seatback S and positioned to be spaced apart from the aperture 200 of the airbag cushion 100 to the occupant side. In particular, the operation tether 300 may pass through the guide part. The seatback S on which the guide part 500 is provided may be a seat frame, and the guide part 500 may be secured to the seatback S and a guide aperture 520 through which the operation tether 300 passes may be formed in the guide part to enable a path of the operating tether 300 to be switched at the seatback side. The guide part 500 may be provided as a tether provided with a guide aperture 520, and may be formed in the form of a bracket secured to the seatback S.

As described above, by providing the guide part 500 which is spaced from a location of the aperture 200 formed on the airbag cushion 100 to the occupant side, the upper chamber 130 may be bending-deformed towards the occupant side by the pulling force caused by the operation tether 300. In the present disclosure, since the upper chamber may wrap around and restrain the occupant when the airbag cushion 100 is deployed, the upper chamber 130 may be deformed to be bent towards the occupant side. Accordingly, the operation tether 300 is provided to pass through the aperture 200 of the airbag cushion 100, the path of the operation tether 300 may be switched with respect to the aperture 200 by connecting the first end portion 301 to the front portion of the upper chamber 130 and connecting the second end portion 302 to the front portion of the central chamber 150, and as a result, when the center chamber 150 is pushed by the occupant, the pulling force is applied to the upper chamber 130 to allow the upper chamber 130 to be deformed.

In addition, by providing the guide part 500 positioned to be spaced apart from a location of the aperture 200 to the occupant side, and allowing the operation tether 300 to pass through the guide part 500 and the aperture 200, the path of the operation tether 300 may be switched with respect to the aperture 200 and the guide part 500, and thus the pulling force of the operation tether 300 may be provided in a direction in which the upper chamber 130 is directed to the occupant side.

Specifically, as illustrated in FIG. 4, since the operation tether 300 includes a first end portion 301 connected to the upper chamber 130, and a second end portion 302 connected to the central chamber 150 and since the operation tether passes the aperture 200 formed in the airbag cushion 100 and the guide part 500 provided on the seatback S, when the central chamber 150 is moved by a pressing caused by the occupant, the second end portion 302 of the operation tether 300 may be moved together with the central chamber 150, and the path of the operation tether 300 passing through the aperture 200 and the guide part 500 may be switched, and thus, the pulling force may be applied to the upper chamber 130 connected to the first end portion 301 of the operation tether 300. Accordingly, the upper chamber 130 may be interlocked with the central chamber 150 by the operation tether 300 and deformed to be bent towards the occupant side, and thus the upper chamber may restrain and protect the occupant. A connection structure of the operation tether 300 according to various exemplary embodiments in accordance with the shape of the upper chamber 130 will be described below.

As illustrated in FIGS. 5 to 10, the upper chamber 130 may be configured to be divided into a plurality of upper chambers to wrap around the occupant's head at a lateral side or a front of the occupant during deployment, and the operation tether 300 may be formed such that the first end portion 301 is divided into a plurality of segments to be connected to the plurality of upper chambers 130, respectively, and the second end portion 302 is connected to the central chamber 150.

As described above, by dividing the upper chamber 130 into the plurality of upper chambers and connecting the segments of the first end portion of the operation tether 300 to the divided upper chambers 130, respectively, the plurality of upper chambers 130 may be interlocked with the central chamber 150 and deformed to wrap around the occupant, and thus, it may be possible to protect and restrain the occupant.

Particularly, as illustrated in FIGS. 5 and 6, the upper chamber 130 may include a first chamber 130a formed to support the occupant's shoulder during deployment and a second chamber 130b that extends upward from the first chamber 130a and formed to wrap a lateral side and the front of the occupant's head, and the operation tether 300 may be formed such that, in a state of being provided to pass through the aperture 200, the first end portion 301 may be divided into the segments to be connected to the first chamber 130a and the second chamber 130b, respectively and the second end portion 302 may be connected to the central chamber 150.

The above-described configuration may be changed into a configuration in a third exemplary embodiment in which the upper chamber 130 of the airbag cushion 100 may include a first chamber 130a configured to protect the occupant's shoulder and a second chamber 130b configured to protect the occupant's head, and the first end portion 301 of the operation tether 300 may be divided into the segments to be connected to the first chamber 130a and the second chamber 130b, respectively, to thus interconnect the first chamber 130a and the second chamber 130b with the central chamber 150 connected to the second end portion 302 of the operation tether 300 to be deformed towards the occupant side. As described above, by dividing the first end portion 301 into the plurality of segments to be connected to the first chamber 130a and the second chamber 130b, respectively, and connecting the second end portion 302 to the central chamber 150, the operation tether 300 may be formed in the shape of "Y" and thus, all the segments of the divided first end portion 301 pass through the aperture 200 when the operation tether 300 is moved.

In other words, as shown in FIG. 6, when the central chamber 150 is moved by a pressing caused by the occupant, the second end portion 302 of the operation tether 300 is moved along with the central chamber 150, and thus, the pulling force is applied to the first chamber 130a and the second chamber 130b which are connected to the segments of first end portion 301 of the operation tether 300, respectively. Particularly, the seatback S may further include the guide part 500 configured to switch the path of the operation tether 300, and a position of the operation tether 300 may be guided by the aperture 200 and the guide unit 500 to induce a deformation to thus bend the first chamber 130a and the second chamber 130b towards the occupant side. Accordingly, the occupant may be wrapped and restrained by the upper chamber 130.

In addition, the airbag cushions 100 may be deployed at both lateral sides of the seatback S, respectively. Accordingly, the upper chambers 130 deployed on the both airbag cushions 100 may be in contact with each other, and the second chambers 130b of the both airbag cushions 100 may be formed in a hook shape to be engaged with each other, and thus, both second chambers 130b may be engaged with each other when the airbag cushions 100 are deployed.

In other words, as illustrated FIG. 7, when a vehicle collision occurs, and thus the occupant presses against the central chamber 150, the upper chamber 130 may be deformed to be bent towards the occupant side by the operation tether 300 connected to the central chamber 150. Since the upper chambers 130 of the both airbag cushions 100 are brought into contact with each other as they are bent towards the occupant side, and the second chambers 130b of both airbag cushions 100 may be formed in a hook shape to be engaged with each other, both second chambers 130b may be engaged and overlapped, and thus a restraining force for the occupant may be secured.

Further, as a pressing force applied to the central chamber 150 increases, the amount of bending of the upper chamber 130 increases, and as a force generated when the second chambers 130b of the both airbag cushions 100 are overlapped and engaged increases, the restraining force capable of restraining the occupant increases. As described above, the airbag cushion 100 including the first chamber 130a and the second chamber 130b may wrap around the occupant's head to protect the occupant's head from impact and simultaneously restrain the occupant, and thus it may be possible to prevent the occupant's neck from being broken.

As a fourth exemplary embodiment illustrated in FIGS. 8 to 10, the upper chamber 130 may include a third chamber 130c configured to support the occupant's shoulder during deployment and a fourth chamber 130d configured to bend at and extending from the third chamber 130c to the occupant side to be disposed in front of the occupant's body, and the operation tether 300 may be formed such that, when passing through the aperture 200, a first end portion 301 may be connected to a front portion of the third chamber 130c and a front portion of the fourth chamber 130d, and a second end portion 302 may be connected to the central chamber 150.

As describe above, the airbag cushion 100 may be formed such that the upper chamber 130 may include the third chamber 130c supporting the occupant's shoulder and the fourth chamber 130d disposed in front of the occupant's body, and the third chamber 130c and the fourth chamber 130d may be in communication with each other. Since the first end portion 301 of the operation tether 300 may be divided into the segments to be connected to the third chamber 130c and the fourth chamber 130d, respectively, the third chamber 130c and the fourth chamber 130d may be interlocked with the central chamber 150, which is connected to the second end portion 302 of the operation tether 300, and thus may be deformed towards the occupant side. Accordingly, by connecting the segments of the first end portion 301 to the third chamber 130c and the fourth chamber 130d, respectively, and connecting the second end portion 302 to the central chamber 150, the operation tether 300 may be formed in the shape of 'Y'.

Specifically, as illustrated in FIG. 9, since the operation tether 300 may have a first end portion 301 divided into the segments to be connected to the third chamber 130c and the fourth chamber 130d, respectively, a second end portion 302 connected to the central chamber 150, and the operation tether passes through the guide aperture 520 formed in the airbag cushion 100, when the central chamber 150 is moved by a pressing caused by the occupant, the second end portion 302 of the operation tether 300 may be moved together with the central chamber 150, and thus the pulling force may be applied to the third chamber 130c and the fourth chamber 130d connected to the first end portion 301 of the operation tether 300.

In particular, since the fourth chamber 130d extends from the front portion of the third chamber 130c to be disposed in front of the occupant's body, when the pulling force is applied to the third chamber 130c and the fourth chamber 130d by the operation tether 300, a substantial bending angle of the fourth chamber 130d may be secured to stably restrain the occupant. In addition, since the airbag cushions 100 may be deployed at both lateral sides of the seatback S and the fourth chambers 130d of the both airbag cushions 100 may be formed in a hook shape to hook or interlock with each other, when the both airbag cushions 100 are deployed, and thus, both fourth chambers 130d may be engaged with each other.

In other words, as illustrated in FIG. 10, when the occupant presses against the central chamber 150 due to a vehicle collision, the upper chamber 130 may be deformed to be bent towards the occupant side by the operation tether 300 connected to the central chamber 150. Since the upper chambers 130 of the both airbag cushions 100 abut against each other as they are bent towards the occupant side, and the fourth chambers 130d of the both airbag cushions 100 may be formed in a hook shape to be engaged with each other, when the both fourth chambers 130d are engaged and overlapped, a restraining force for the occupant may be secured.

In addition, as a pressing force applied to the central chamber 150 increases, the amount of bending of the upper chambers 130 increases, and as a force generated by overlapping and engaging the fourth chambers 130d of the both airbag cushions 100 increases, the restraining force capable of restraining the occupant increases.

As described above, the airbag for a vehicle according to the present disclosure may safely protect and restrain the occupant through a shape of the airbag cushion 100 and a connection structure of the operation tether 300. In other words, in response to a movement of the occupant caused by the vehicle collision, the chambers may be interlocked with each other and deformed by the operation tether, and thus the chambers may wrap around and restrain the occupant. As a result, the occupant may be wrapped by the airbag cushion to be protected from the impact, and a neck breaking may be prevented, and thus the occurrence of injury may be minimized.

The airbag for a vehicle having the above-described structure protects the occupant using the airbag cushion deployed at a lateral side of the seatback when a vehicle collision occurs. Further, since the airbag cushion includes the plurality of chambers and the plurality of chambers may be connected to be interlocked with each other by the operation tether, when the occupant is pressed against the specific chamber due to a vehicle collision, the other chamber may be deformed to wrap around the occupant, to thus restrain the occupant in the seat to minimize any potential injury.

Although the exemplary embodiments of the present disclosure have been illustrated and described for illustrative purposes, those skilled in the art will appreciate that various modifications, additions and substitutions are possible, without departing from the scope and spirit of the invention as disclosed in the accompanying claims.

What is claimed is:

1. An airbag for a vehicle, comprising:
   an airbag cushion positioned proximate to a seatback, having a plurality of chambers to be deployed in front of the seatback, and having an aperture formed at a rear portion of the airbag cushion; and
   an operation tether which is provided to pass through the aperture, and is connected at both end portions thereof to the plurality of chambers, respectively and which, when an occupant pushes against a first chamber of the plurality of chambers due to a vehicle collision, provides a pulling force to a second chamber of the plurality of chambers to cause the second chamber of the plurality of chambers to be bent towards an occupant side.

2. The airbag for a vehicle according to claim 1, wherein:
   the first chamber is an upper chamber to be disposed proximate the occupant's head and the second chamber is a lower chamber to be disposed proximate to the occupant's body during deployment, and
   the operation tether is provided to pass through the aperture, a first end portion of the operation tether is connected to the upper chamber, and a second end portion of the operation tether is connected to the lower chamber.

3. The airbag for a vehicle according to claim 2, wherein, when the operation tether is provided to pass through the aperture, the first end portion of the operation tether is connected to a front portion of the upper chamber and the second end portion of the operation tether is connected to a front portion of the lower chamber.

4. The airbag for a vehicle according to claim 2, further comprising:
   a restraint tether secured at both ends thereof to the seatback and extending from the occupant side away from the occupant to wrap around the upper chamber.

5. The airbag for a vehicle according to claim 4, wherein the first end portion of the operation tether is connected to the front portion of the upper chamber and the second end portion of the operation tether is connected to the restraint tether, wherein the second end portion of the operation tether is connected to an end portion of the restraint tether located at the occupant side.

6. The airbag for a vehicle according to claim 1, wherein:
   the first chamber is an upper chamber to be disposed proximate to the occupant's shoulder or the occupant's head during deployment; the second chamber is a lower chamber to be disposed proximate to the occupant's body during deployment; and a central chamber of the plurality of chambers is positioned between the upper chamber and the lower chamber, and disposed in front of the occupant's body during deployment, and
   the operation tether is provided to pass through the aperture, a first end portion of the operation tether is connected to the upper chamber, and a second end portion of the operation tether is connected to the central chamber.

7. The airbag for a vehicle according to claim 6, wherein the aperture is formed in a rear portion of the upper chamber.

8. The airbag for a vehicle according to claim 6, wherein the first end portion of the operation tether is connected to a front portion of the upper chamber and the second end portion of the operation tether is connected to a front portion of the central chamber.

9. The airbag for a vehicle according to claim 6, further comprising:
   a guide part through which the operation tether passes, wherein the guide part is installed on the seatback and positioned to be spaced apart from the aperture of the airbag cushion to the occupant side.

10. The airbag for a vehicle according to claim 9, wherein the guide part is secured to the seatback and includes a guide aperture formed therein to allow the operation tether to pass therethrough.

11. The airbag for a vehicle according to claim 6, wherein:
    the upper chamber is configured to be divided into a plurality of upper chambers to wrap around the occupant's head at a lateral side or in front of the occupant during deployment, and
    the operation tether is formed the first end portion divided into a plurality of segments to be connected to the plurality of upper chambers, respectively, and the second end portion connected to the central chamber.

12. The airbag for a vehicle according to claim 11, wherein:
    the upper chamber includes a first upper chamber formed to support the occupant's shoulder during deployment and a second upper chamber extending upward from the first upper chamber and formed to wrap around a lateral side and the front of the occupant's head, and
    when the operation tether passes through the aperture, the first end portion of the operation tether is divided into the segments to be connected to the first upper chamber and the second upper chamber, respectively and the second end portion of the operation tether is connected to the central chamber.

13. The airbag for a vehicle according to claim 12, wherein:
    the airbag cushion includes a pair of airbag cushions that are configured to be deployed at both sides of the seatback, respectively, and
    the second upper chambers of the both airbag cushions are formed in a hook shape to be engaged with each other, and both second upper chambers are engaged with each other when the airbag cushions are deployed.

14. The airbag for a vehicle according to claim 11, wherein:
    the upper chamber includes a first upper chamber formed to support the occupant's shoulder during deployment and a second upper chamber formed to be bent at and extend from the third upper chamber towards the occupant side to be disposed in front of the occupant's body, and when the operation tether passes through the aperture, the first end portion of the operation tether is connected to a front portion of the first upper chamber and a front portion of the second upper chamber, and the second end portion of the operation tether is connected to the central chamber.

15. The airbag for a vehicle according to claim 14, wherein:
the airbag cushion includes a pair of airbag cushions that are configured to be deployed at both sides of the seatback, respectively, and
the second upper chambers of the both airbag cushions are formed in a hook shape to be engaged with each other, and both second upper chambers are engaged with each other when the airbag cushions are deployed.

\* \* \* \* \*